United States Patent [19]

Staarman et al.

[11] Patent Number: 5,179,337

[45] Date of Patent: Jan. 12, 1993

[54] OVER-DISCHARGE PROTECTION FOR RECHARGEABLE BATTERIES

[75] Inventors: John L. Staarman; Theodore B. Ziemkowski, both of Boulder, Colo.

[73] Assignee: International Business Machines Corporation, Armonk, N.Y.

[21] Appl. No.: 791,812

[22] Filed: Nov. 13, 1991

[51] Int. Cl.⁵ .............................. H02J 7/00
[52] U.S. Cl. ......................... 320/13; 320/40
[58] Field of Search ............ 320/5, 8, 9, 13, 14, 320/19, 39, 40

[56] References Cited

U.S. PATENT DOCUMENTS

| | | | |
|---|---|---|---|
| 3,721,887 | 3/1973 | Nickerson | 320/13 |
| 4,056,765 | 11/1977 | Scheidler et al. | 320/48 |
| 4,291,266 | 9/1981 | Portmann | 320/2 |
| 4,302,791 | 11/1981 | Buchanan et al. | 361/90 X |
| 4,342,953 | 8/1982 | Collins | 320/13 |
| 4,546,302 | 10/1985 | Smith | 320/25 |
| 4,698,578 | 10/1987 | Mullersman et al. | 320/13 |
| 4,704,542 | 11/1987 | Hwang | 320/13 X |
| 4,785,229 | 11/1988 | Edwards | 323/284 |
| 4,845,391 | 7/1989 | Gulczynski | 307/631 |
| 4,857,985 | 8/1989 | Miller | 357/42 |
| 4,980,746 | 12/1990 | Harrington, III | 357/42 |

FOREIGN PATENT DOCUMENTS

| | | | |
|---|---|---|---|
| 2732794 | 2/1979 | Fed. Rep. of Germany | 320/13 |
| 0698081 | 11/1979 | U.S.S.R. | 320/13 |

*Primary Examiner*—Steven L. Stephan
*Assistant Examiner*—Kristine Peckman
*Attorney, Agent, or Firm*—Carl M. Wright

[57] ABSTRACT

Field-effect transistor coupled to conduct current from a rechargeable battery to a load so long as the voltage potential across the rechargeable battery is sufficient to turn on the field-effect transistor to prevent the rechargeable battery discharging below a predetermined value, thereby protecting the rechargeable battery from permanent damage from overdischarge.

1 Claim, 1 Drawing Sheet

OVER-DISCHARGE PROTECTION FOR RECHARGEABLE BATTERIES

BACKGROUND AND SUMMARY OF THE INVENTION

The invention relates to protecting batteries, especially rechargeable batteries, from discharging past the point where internal chemical and physical changes occur that render the battery incapable of being fully recharged.

Rechargeable batteries are expensive, the expense increasing with the capacity. Nickel-cadmium and lithium rechargeable batteries have long shelf lives and high capacity, characteristics that make them useful in applications such as laptop computers, portable electric tools and high intensity lamps. Lithium batteries have a tendency to explode if operated beyond their capacity. Nickel-cadmium batteries reverse polarity if discharged below a threshold value.

Rechargeable batteries are irreversibly damaged if too much energy is drained before recharging. Internal chemical and physical alterations take place if power is taken after the energy level of the battery falls below a certain threshold.

Prior art circuits include relays wired in series or parallel with the load with the normally open contacts in series with the battery and the load. While the battery is sufficiently charged to keep the relay activated, the battery is coupled to the load. When the potential drops below a value depending on the characteristics of the relay, the relay drops out, opening the circuit between the battery and the load. This arrangement consumes an inordinate amount of power in the relay coil and the relays suitable for the purpose are expensive. Relays that are kept on for long lengths of time tend to lock up and fail to drop out when sufficient power is no longer applied because of magnetization of the relay components.

Other prior art circuits include solid state circuits using a plurality of circuit components to sense the voltage being applied and to operate a switch, usually a transistor, when the sensed voltage falls to a predetermined value. The circuits themselves consume power which shortens the operating time of the rechargeable batteries.

U.S. Pat. No. 4,342,953 shows a battery protection circuit for preventing overdischarge of rechargeable batteries. A sensing stage is provided to cause a light, powered by the rechargeable battery, to dim as the cutoff voltage is approached.

U.S. Pat. No. 4,056,765 discloses a triplet of monitor circuits for sensing the output voltages associated with charging a battery. A first circuit employs a zener diode and detects excessively low battery voltage. A second circuit detects excessively low generator voltage. A third circuit detects an excessively high charging voltage. The circuits do not control the voltages but merely supply an indication of the various conditions.

U.S. Pat. No. 4,785,229 discloses a battery protection circuit for shutting down power when the monitored voltage falls below a predetermined threshold value.

U.S. Pat. No. 4,698,578 teaches a circuit for controlling the supply of power from a battery to a load. When the circuit detects that the remaining energy in the battery has dropped to a predetermined value, it supplies a notification to the operator.

U.S. Pat. No. 4,291,266 shows a circuit for charging a battery from solar cells, for example, by acting as an ideal diode, i.e., eliminating the forward voltage drop across an actual diode. This reduces the loss in a low drain circuit such as an electronic wristwatch.

U.S. Pat. No. 4,302,791 discloses a circuit using a pair of MOSFET transistors as switches to apply or to remove positive and negative voltages to a protected device simultaneously. This is useful when sequencing power to operational amplifiers, for example, when one of the power supplies is interrupted or abnormal, subjecting the powered device to unusual and unbalanced power conditions.

U.S. Pat. No. 4,546,302 relates to a protective circuit for a current regulated battery charging circuit from damage due to reverse polarity or short circuits.

U.S. Pat. No. 4,980,746 shows an integrated circuit diode for isolating a back up power supply battery so the battery cannot be charged while the primary power supply is active. The invention is the construction of the diode on the substrate to prevent minority carrier diffusion.

U.S. Pat. No. 4,845,391 discloses a three terminal switching power supply incorporating fast switching speed with low forward voltage drop. The circuit can function as if it were a thyristor or triac that can be switched by a gate voltage of one polarity.

U.S. Pat. No. 4,704,542 teaches a standby power supply circuit that disconnects the battery when the voltage drops below a given potential.

U.S. Pat. No. 3,721,887 shows a bistable circuit that is energized by an A-C supply to an unregulated power supply to couple power to a load. When the A-C supply fails, the load is coupled to a battery back up supply. The load is disconnected from the battery when the latter's voltage drops below a threshold value. Power to the load can then be resupplied only when the A-C supply is restored.

U.S. Pat. No. 4,857,985 teaches an FET as part of an integrated circuit for protecting the integrated circuit from reverse polarity.

While suitable for their purposes, the prior art circuits use complicated circuitry for sensing voltages and controlling switches. The circuits themselves consume power and are subject to failure or damage under abnormal conditions.

According to the invention, a field-effect transistor (FET) is coupled with its gate and source across the terminals of the rechargeable battery and its drain and gate forming the connections to the load. So long as the source-to-gate voltage exceeds a certain threshold, depending on the characteristics of the FET, the battery is effectively coupled to the load. When the voltage supplied by the rechargeable battery falls below a certain value, i.e., the voltage required to turn on the FET, the FET ceases to conduct, effectively disconnecting the battery from the load, preventing any further discharge of the battery.

FETs having different characteristics are easily available so there is usually an FET type for any application. The characteristics of importance are the gate-to-source voltage needed to turn on the FET and the power rating. Since MOSFETs have low leakage currents, they are an effective switch for this application.

The simplicity of the circuit for protecting rechargeable batteries makes it universally useful for circuits with rechargeable batteries from laptop computers to flashlights.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

The invention is the use of a three-terminal device having the characteristics of conducting electrical current from a first terminal to a second terminal so long as the voltage between the first and third terminals exceed a given threshold connected between a rechargeable battery and a load so that, when the rechargeable battery discharges to the point that its voltage is less that the threshold value, it disconnects the battery from the load to prevent any further discharge.

The characteristics of field-effect transistors have cut-off voltages between the gate and source that make such transistors useful for making the invention. The characteristics of a metal-oxide semiconductor field-effect transistor (MOSFET) are especially suitable for the invention because, in addition to the cut-off characteristics, the gate draws negligible current and therefore does not bleed additional current after cut-off as would be the case with a bipolar transistor.

Figure 1:
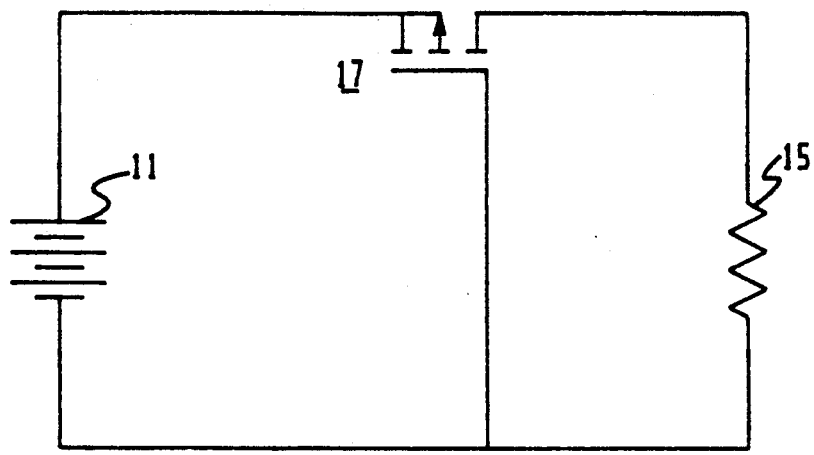
FIG. 1 is a circuit according to the invention.

In the circuit of FIG. 1, an MOSFET 17 is coupled so that current is passed from a rechargeable battery 11 to a load 15 so long as the MOSFET 17 is forward biased by virtue of its gate terminal being connected to the negative terminal of the rechargeable battery 11 and its source to the positive terminal.

When the rechargeable battery 11 discharges to the point at which its voltage is at or below the value of the MOSFET 17 gate-to-source cut-off voltage, the MOSFET 17 effectively disconnects the battery 11 from the load 15, preventing further discharge of the rechargeable battery.

Because of the extremely low gate current of the MOSFET 17, the rechargeable battery 11 does not discharge further.

A typical commercially available MOSFET suitable for the described purpose is a Motorola MTP3N40 which has a cut-off voltage of approximately four volts.

Figure 2:
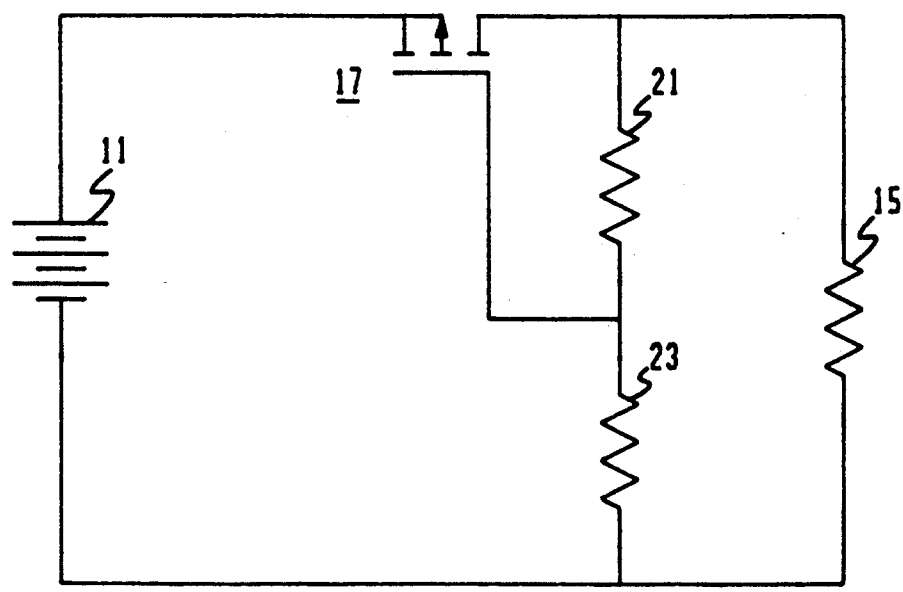
FIG. 2 is an alternate embodiment of the invention.

If necessary, the cut-off voltage can be set by a voltage divider as illustrated in the embodiment shown in FIG. 2. The rechargeable battery 11, the load 15, and the MOSFET 17 operate as previously described except that the gate terminal of the MOSFET 17 is connected to a voltage divider formed by resistors 21 and 23. By choosing resistor values in a manner well known in the art, the cut-off voltage of the MOSFET 17 can be set to a predetermined value. In the case of the MTP3N40, the MOSFET 17 can be biased to cut-off when the voltage supplied by the rechargeable battery 11 falls below six volts.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. The combination comprising:

load means having first and second terminal means for coupling to a power supply source;

rechargeable battery means having first and second terminal means for supplying power to said load means, said rechargeable battery means to be protected from discharge below a critical voltage to prevent permanent damage to said rechargeable battery means;

means for coupling the first terminal means of said load means to the first terminal means of said rechargeable battery means;

field effect transistor means having source terminal means, gate terminal means, and drain terminal means for coupling the second terminal means of said load means to the second terminal means of said rechargeable battery means;

means for coupling said source terminal means to the second terminal means of said rechargeable battery means;

means for coupling said drain terminal means to the second terminal means of said load means for supplying power to the load means while said rechargeable battery means supplies a voltage exceeding a potential determined by the source-gate characteristics of the field effect transistor means;

voltage divider means coupled across the first and second terminal means of said load means; and means for coupling said gate terminal means to the center of said voltage divider means.

* * * * *